Patented Aug. 29, 1933

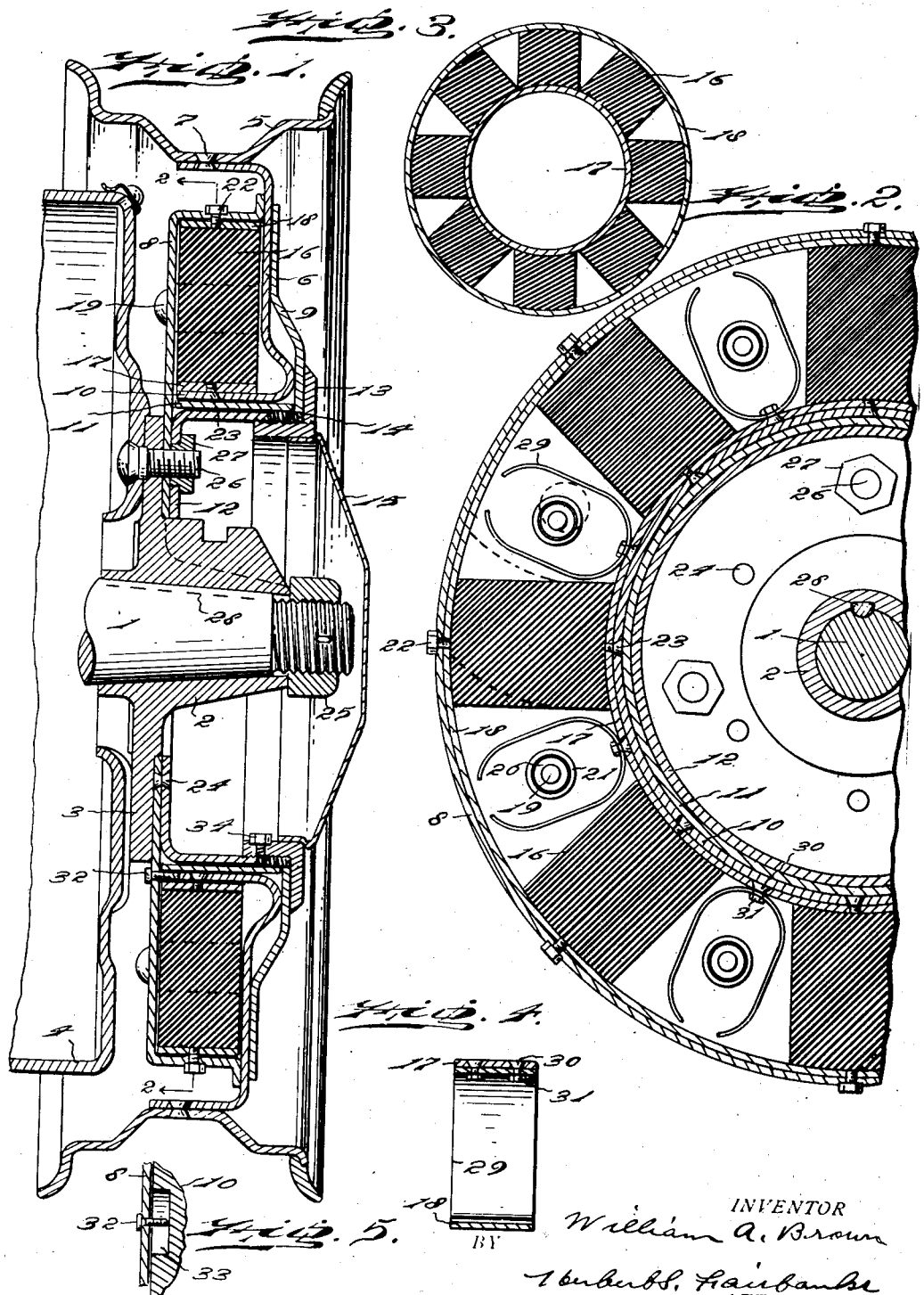

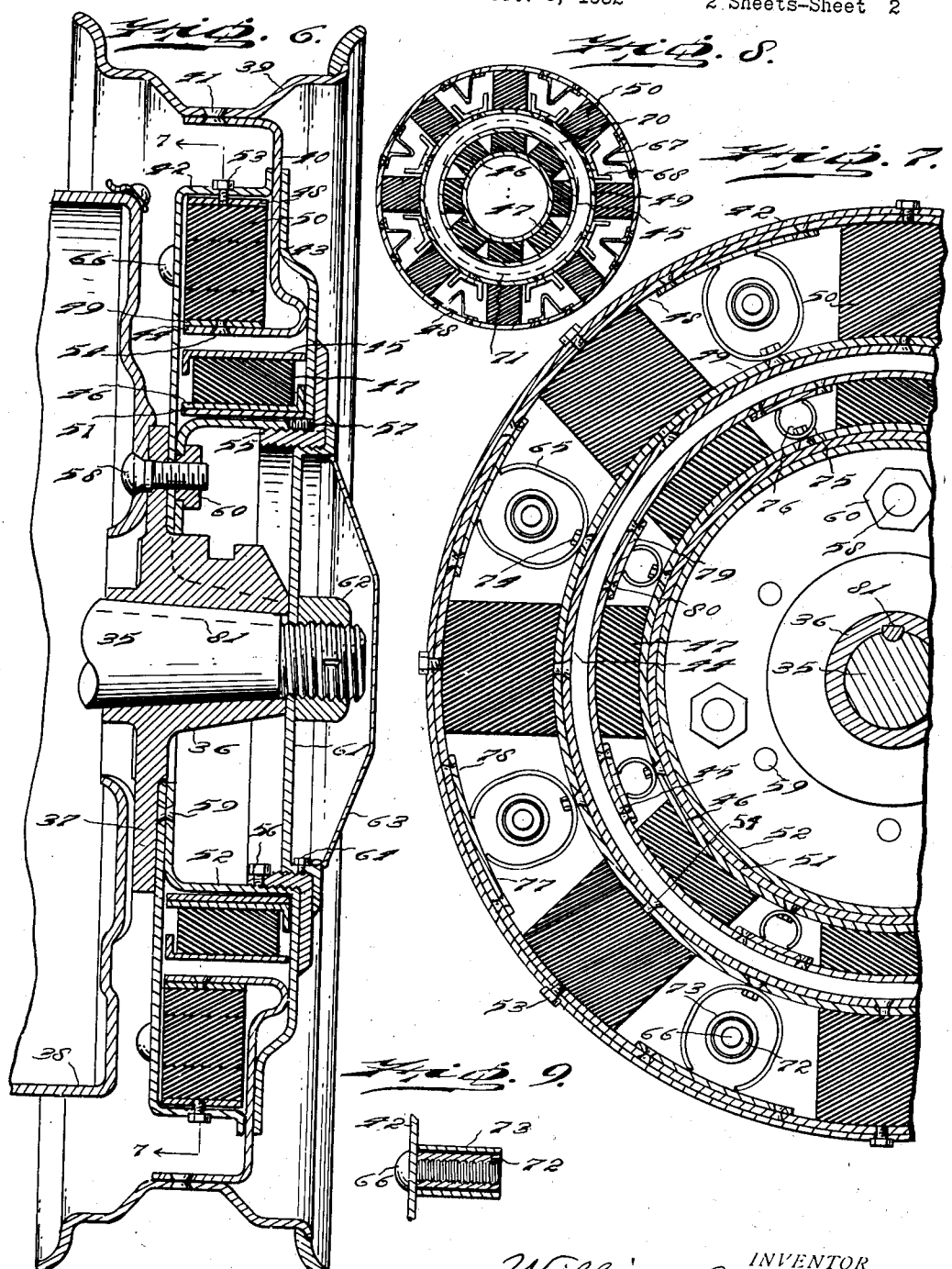

1,924,269

UNITED STATES PATENT OFFICE 1,924,269

SHOCK ABSORBING WHEEL

William A. Brown, Philadelphia, Pa.

Application October 3, 1932. Serial No. 635,926

20 Claims. (Cl. 152—28)

My invention relates to improvements of vehicle wheels for use on all forms of transportation wherein means are provided for absorbing torque and brake shock as well as road shock. The prime object of this invention is to provide a vehicle wheel so simple in its construction and operation that it may be assembled and mounted, ready for service, by any unskilled person with the tools to be found in the regular vehicle tool box. Such an assembly can be guaranteed by the manufacturer to perform as required since the resilient means employed in my construction will be assembled and tested as a unit at the factory prior to releasing it for insertion in the wheel.

A further object of this invention is to provide a vehicle wheel with a torque and brake cushion drive, which may be quickly and inexpensively converted, if desired, into a shock absorbing axle suspension as well, to provide independent springing of each wheel and a minimum of unsprung weight.

A further object of this invention is to provide an economical and efficient means for absorbing torque and brake shock as well as road shock when desired, which can be cheaply manufactured and will prove durable in operation.

A further object of this invention is to provide a completely assembled and tested resilient means which may be purchased anytime and everywhere by the vehicle operator, for replacement purposes by unskilled labor.

A further object of this invention is to provide a construction in which destructful frictional contacts have been eliminated.

A further object of this invention is to provide a construction in which the problem of lubrication is eliminated.

A further object of this invention is to provide a construction which will protect the resilient means employed from dust and the like.

A further and important object of this invention is to provide a construction of the utmost stability notwithstanding the maximum of resiliency provided.

A further object of this invention is to provide a construction employing a non-metallic resilient material, preferably of rubber, which is under tension throughout its entire area prior to assembling with the wheel.

A further and vitally important object of this invention is to provide an efficient torque and brake cushion drive under all operating conditions with the entire wheel structure remaining in a concentric position at all times.

A further and equally important object of this invention is to provide a construction having auxiliary means for absorbing road shock entirely distinct and separate from the means used to absorb torque and brake shock.

A further and equally important object of this invention is to provide a construction having auxiliary means for absorbing road shock which is brought into action only under abnormal impact, or excessive loading.

A further and important object of this invention is to provide a wheel construction which may be detached from the vehicle in its assembled state as a unit of structure by any person, anywhere, with the simplest of tools, and which is interchangeable on the same hub, for automotive transportation, with any standard stiff wheel.

Another object of this invention is to provide resilient means, comprising a combination of non-metallic material and metal springs, which may be assembled and tested as a unit at the factory.

A further object of this invention is to devise a novel, resilient, quick detachable member consisting of two metallic bands to which circumferentially disposed rubber is vulcanized in spaced relationship so that the rubber will be in tension throughout its mass after vulcanization and under no condition arising in practice will it be under compression to an extent to cause premature disintegration.

With the above and other objects in view as will hereinafter appear my invention comprehends a novel shock absorbing wheel.

Other novel features of construction and advantage will hereinafter more clearly appear in the detailed description and the appended claims.

For the purpose of illustrating the invention I have shown in the accompanying drawings, typical embodiments of it, which, in practice, will give reliable and satisfactory results. It is, however, to be understood that these embodiments are typical only, and the various instrumentalities of which my invention consists can be variously arranged and organized, and the invention is not limited to the precise arrangement and organization of these instrumentalities as herein set forth.

Figure 1 is a sectional elevation of a wheel, embodying my invention.

Figure 2 is a transverse section on line 2—2 of Figure 1.

Figure 3 is a sectional view of another embodiment of my invention.

Figure 4 is a sectional view of a spring employed.

Figure 5 is a sectional detail view showing more clearly a stop device employed.

Figure 6 is a sectional elevation of another embodiment of my invention.

Figure 7 is a sectional view of the construction shown in Figure 6 the section being on line 7—7 of Figure 6.

Figure 8 is a sectional view of another embodiment of the invention.

Figure 9 is a sectional view of a driving stud.

Similar numerals of reference indicate corresponding parts.

Referring to the drawings:

1 designates the rear axle to which a flanged hub 2 is keyed. The flange 3 of the hub 2 carries a conventional brake drum 4. 5 designates a conventional drop center rim which is attached to a driven member 6 by means of fastening devices 7, such as for example the rivets seen in Figure 1.

8 designates an inner abutment which is also the driving member and is deflected outwardly at its periphery to have a bearing on the driven member 6. 9 is an outer abutment, inwardly deflected to bear on the driven member 6. It will thus be seen that the members 8 and 9 maintain the driven member 6 in a perpendicular position under all driving conditions, and a construction of the utmost strength is thus provided that will permit of a maximum of resiliency, without affecting the inherent stability of the structure. In certain cases in practice the flanges of the inner and outer abutments 8 and 9, which are in contact with the driven member 6, may be permanently lubricated to eliminate friction and noise at this point. The driven member 6 is inwardly deflected at its inner periphery to form a shoulder 10 which is in contact throughout its circumference with a bearing member 11 which is preferably impregnated with a permanent high temperature graphite grease to minimize any friction between the shoulder 10, the bearing member 11 and a cylindrical member 12 during rotation of the driven member 6 under torque and brake shock. Attention is directed to the fact that the length of the shoulder 10 of the driven member 6 and the method employed in mounting said shoulder in relation to the self lubricating bearing member 11 and the cylindrical support 12 will, under normal driving conditions, maintain the wheel structure in a perpendicular position without the aid of the inner and outer abutments 8 and 9. The cylindrical member 12 supports the driven member 6 which in turn carries the rim 5 on which the tire is mounted. The assembly nut 13 which is in threaded engagement with the cylindrical support 12 is held in its adjusted position by means of the set screws 34. The outer abutment 9 is rigidly held in its assembled position by means of the fastening devices 14 which are in threaded engagement with the outer abutment 9, and seated in slots in the support 12. 15 designates a conventional wheel cap which is pressed into position on the assembly nut 13 as shown. The resilient material 16 is preferably of rubber vulcanized to the inner and outer bands 17 and 18. The bands 17 and 18 may be brass plated prior to vulcanization to insure an unbreakable joint between the rubber and the bands. Attention is directed to the fact that during and after vulcanization, particularly while the rubber is cooling, there is a condition resulting of initial tension of the entire mass which insures a desirable cushioning resistance to torque and brake shock under all operating conditions. The inboard abutment 8 has circumferentially spaced driving members 19 comprising a stud 20 in threaded engagement with said driving members, and a hardened bushing 21 that revolves around the outer wall of the stud 20.

The outer band 18 is rigidly attached to the inner abutment or driving member 8 by means of fastening devices 22 and the inner band 17 is rigidly attached to the driven member 6 by means of the fastening devices 23.

In order to clearly understand the simplicity of the wheel assembly and the ease with which it may be assembled, disassembled or mounted ready for service by any unskilled person, attention is directed to the method of assembling a complete wheel which would be as follows: The inner abutment 8 and the cylindrical support 12 are permanently joined together at the factory by means of the circumferentially spaced fastening devices 24, such as for example the rivets seen in Figure 1. The lubricated bearing member 11, which may be in the form of an oilless bearing is slipped into position over the cylindrical support 12. The driven member 6 to which has already been attached the inner band 17 by means of the screws 23 is then dropped into position and adjusted so that the openings in the outer periphery of the inner abutment 8 that receive the fastening devices 22, such as for example the screws shown in Figure 1, coincide with the tapped openings in the outer band 18 to permit of the insertion of the screws 22. The outer abutment 9, which has a number of circumferentially spaced theaded openings to receive the screws 14 which are screwed into position prior to assembly, is then placed in position, with the free ends of the screws 14 fitting into the circumferentially spaced openings in the cylindrical support 12. which coincide with the threaded openings in the abutment 9 to insure simultaneous movement as a unit of the inner abutment 8, the cylindrical support 12 and the outer abutment 9. The assembly nut 13, which has an inwardly extending threaded flange which is in threaded engagement with the cylindrical support 12, is then screwed into position to create a permanent, rigid, indestructible assembly. The wheel assembly is then ready for mounting on the flange 3 of the hub 2 which is held in permanent position on the axle 1 by means of the nut 25 and the key 28. The inner abutment or driving member 8 and the cylindrical support 12, which are permanently joined together by the fastening devices 24 have circumferentially spaced openings to fit the standard hub bolt 26, and the entire wheel assembly is slipped into position over these bolts 26, and held in permanent relation thereto by means of hexagon nuts 27. The object is to construct the wheel and to position these mounting openings in the exact location to be found in a standard stiff wheel so that the present structure can be interchanged with a standard stiff wheel on the same hub by any unskilled person, anywhere. After the nuts 27 are tightened, the wheel cap 15 is pressed into position on the assembly nut 13 and the wheel is ready for operation. Specific attention is directed to the fact that the resilient means comprising the inner and outer bands 17 and 18 and the resilient material 16 may be quickly and easily removed as a unit of structure by loosening the fastening devices 22 and 23 which will enable any unskilled person to replace to resilient means, anywhere, with the simplest of tools, and since the resilient means employed is assembled and tested as a complete unit at the factory the replacement member may be the exact duplicate in every respect of the resilient member to be removed. The general character and preferred embodiment of this resilient member will be more clearly understood from Figure 2 which shows the manner in which the vulcanized rubber 16 is used in combination with the metal springs 29, which are adjacent to the driving members 19 and act to relieve the vulcanized rubber 16 of all frictional contacts with the driving members 19, as well as supplementing the vulcanized rubber 16 in absorbing brake and torque shock.

It will be seen from Figure 2 that the rubber 16 which is vulcanized to the bands 17 and 18 in a manner to produce initial tension in the entire mass is in segments which are separated by the springs 29. The springs 29 are so arranged that they are brought into action only under abnormal torque and brake shock as will be clearly understood from the dotted position shown of a rubber segment 16 and the driving means 19 under normal shock. Under abnormal torque and brake shock, the driving means 19 press against one wall of the springs 29 while at the same time the adjacent segment of rubber begins to press against the other wall of the springs 29 so that there is a rapid build up of the cushioning resistance to torque and brake shock with which to completely dampen out such shocks, regardless of their intensity, through this combined use of the entire resilient material in each wheel under very desirable circumstances. In other words, normal torque and brake shock are absorbed by the rubber alone under tension, and abnormal torque and brake shock are cushioned and dampened out by means of the aforesaid effective combination of rubber and metal springs.

Attention is also directed to the fact that the combination of the vulcanized rubber and the metal springs working together under abnormal shock provide a positive safeguard against collapse of the resilient means employed, regardless of the operating conditions encountered, while, at the same time, permitting a maximum movement in either direction with which to absorb and dampen out torque and brake shock.

Figure 3 shows a modification of the resilient means employed wherein the use of metal springs is dispensed with and circumferentially disposed rubber vulcanized to the metal bands 17 and 18, so that the rubber is solely employed and will be under tension throughout its mass after vulcanization. This construction under many conditions of service is preferred especially in those cases where cost is a vital consideration and a cheap but durable construction is required. It will be understood that in those instances where torque and brake shock are excessive and an inexpensive construction is required to provide proper cushioning that the rubber mass may occupy the entire space between the metal bands 17 and 18.

Figure 4 shows the method employed of attaching the springs 29 to the inner band 17 by means of fastening devices 30 which are preferably countersunk screws having the nuts 31. It will also be seen from this figure that the springs 29 are preferably of the same width as the rubber segments 16 in order that the entire outer wall of the springs 29 will press against the entire wall of the rubber segments 16 under abnormal torque and brake shock to prevent the springs 29 from cutting or marring the rubber segments 16.

Figure 5 shows an auxiliary safety provision to prevent the driving member 8 from revolving freely around the driven member 6, in the event of careless roadside mounting of the resilient means on the driven and driving members 6 and 8. As will be seen the shoulder 10 of the driven member 6 has a number of spaced slots in which the bolts 32 which are in threaded engagement with the inner abutment or driving member 8 are placed, so that the side walls of the openings 33 which need not be of very great length to function properly without interfering with the movement of the driven member 6 in relation to the driving member 8 in absorbing torque and brake shock, since the driven member 6 will have a limited movement around the cylindrical support 12 at the point where the auxiliary stops 32 are placed.

It will be understood from Figures 1 and 2 that the entire wheel assembly remains concentric under all conditions of operation, and that there are no disintegrating frictional problems present either in the rubber or in any other part of the construction, and that the need for lubricant is entirely eliminated, except in the case of the bearing member 11 which is in the form of an oilless bearing wherein lubrication is applied but once at the factory.

It will be understood from the foregoing description of the assembly and operation of the construction shown in Figures 1 and 2, that it is absolutely noiseless under all operating conditions.

The construction disclosed in Figure 6 embodies all of the advantages of the torque and brake cushion drive shown in Figure 1 plus the important features of a road impact shock absorbing axle suspension, which provides independent springing of each wheel and a minimum of unsprung weight. The same ease of assembling a complete wheel and the possible replacement anywhere of the resilient unit by unskilled labor, claimed for the construction shown in Figure 1, are equally true of the construction shown in Figure 6.

In Figure 6, 35 designates the rear axle to which a flanged hub 36 is rigidly attached by means of the key 81 and the nut 62. The flange 37 of the hub 36 carries a conventional brake drum 38. 39 designates a conventional drop center rim which is attached to the floating driven member 40 by means of the fastening devices 41 such as for example the rivets seen in Figure 6. 42 designates an inner abutment which is also the driving member and is deflected outwardly at its periphery to have a bearing on the floating driven member 40. 43 is an outer abutment which is inwardly deflected to bear on the floating driven member 40. It will thus be seen that a construction of the utmost stability is thus provided through the combined use of the inner and outer abutments 42 and 43 to maintain the floating driven member 40 in a perpendicular position under all conditions of driving. The flanges of the inner and outer abutments 42 and 43, which are in contact with the floating driven member 40, may be permanently lubricated, if desired, to eliminate friction and noise at this point. The driven member 40 is inwardly deflected at its inner periphery to form the shoulder 44 which moves into contact, under severe road shock and excessive loading, with the outer band 45 of the auxiliary road impact shock absorbing member comprising the outer band 45, the inner band 46 and the resilient material 47, which is preferably rubber vulcanized to the bands 45 and 46 in such a manner as to obtain initial tension throughout the entire mass after vulcanization has taken place. It is to be understood however, that the location of the auxiliary cushioning member in its relation to the floating driven member 40 will vary according to the requirements of each application and that in many instances it will be desirable to have the shoulder 44 of the floating driven member 40 in constant contact with the outer annulus 45 of the cushioning member. The resilient means comprising the outer band 48, the inner band 49, which are rigidly attached to the driving and driven members 42 and 40, and the resilient material 50, which is preferably of rubber vulcanized to both bands in a manner to produce initial tension throughout the entire mass after vulcanization, perform the same service in absorbing torque and brake shock under the same conditions already described for Figure 1. In other words, the driving member 42 revolves in either direction around the floating driven member 40 in cushioning or dampening out torque and brake shock by means of the resilient member comprising the inner and outer bands 48 and 49 and the resilient material 50 which is permanently attached thereto. The auxiliary road impact shock absorbing member comprising the inner and outer bands 45 and 46 and the resilient material 47, which is preferably of rubber permanently attached to these bands during vulcanization, revolves freely with the bearing member 51, which is of the same oilless type already described for Figure 1, around the cylindrical support 52. The bearing member 51 contacts throughout its entire circumference against the cylindrical support 52, so that, under combined torque or brake shock plus road shock, this bearing member 51 because of its permanently lubricated condition removes the possibility of friction at this point.

The outer band 48 and the inner band 49 are rigidly held in their assembled position by means of the fastening devices 53 and 54 in the same manner as already described for Figure 1. The assembly nut 55, which is in threaded engagement with the cylindrical support 52, is held in position by means of the set screws 56. The outer abutment 43 is prevented from moving around the cylindrical support 52 by means of the set screws 57 which are in threaded engagement with the outer abutment 43 and extend into a series of slots in the cylindrical member 52 in the same identical manner already described for Figure 1. On mounting the assembly nut 55, it will be seen that the entire wheel is ready to be attached to the flange 37 of the hub 36 by means of the bolts 58 by the same method already described for Figure 1. The inner abutment 42 and the cylindrical support 52, which are permanently joined together by means of the rivets 59, have a series of spaced openings to receive the bolts 58 and by tightening or loosening the nuts 60 the entire wheel structure can be mounted or demounted as required, by any unskilled person. The cylindrical reinforcing member 61 which is placed in position after the wheel has been attached to the hub flange 37 by means of the nuts 60, is in threaded engagement with the assembly nut 55 and is closely fitted to the threaded end of the axle 35 to resist and prevent any abnormal road impact shock from being entirely carried by the hub flange 37. The axle nut 62 and the screws 64 help to maintain the reinforcing member 61 in a rigid position under all driving conditions. It will be understood, however, that the use of this reinforcing member 61 may be dispensed with under many conditions in practice. With the cover 63 placed into position, the wheel is then ready for operation and service.

It is unnecessary to repeat the general procedure of assembling a complete wheel structure since it is practically the same as described for Figure 1 and can be properly done anywhere by unskilled labor with the simplest of tools.

The general character and preferred embodiment of the construction shown in Figure 6 will be more clearly understood from Figure 7, since it shows the manner in which the vulcanized rubber 50 is used in combination with the metal springs 65, which are adjacent to the driving members 66 and act to relieve the vulcanized rubber 50 of all frictional contacts with the driving members 66 as well as supplementing the vulcanized rubber 50 in absorbing torque and brake shock in the same identical manner as already described for Figure 1, and in helping to cushion road shock as well. The springs 65 are rigidly attached to the inner band 49 by the fastening devices 74 in the manner already described in Figure 1 and shown in detail in Figure 4. The hardened rectangular disks 77 which are held in position on the band 48 by means of the rivets 78 protect the band 48 against any disintegrating rubbing action that may be caused by the springs 65 when under maximum compression. The disks 79 which are held in position on the band 45 by the rivets 80 are similar to the disks 77 and perform the same service for the band 45 when the springs 75 are under maximum compression.

The same preferred combination of vulcanized rubber under initial tension, in combination with metallic springs as already described for the main resilient member would be used in the construction of the auxiliary resilient member comprising the outer and inner bands 45 and 46 and the resilient material 47. The springs 75 would be rigidly held in position on the inner band 46 by the fastening devices 76 in the same manner as shown in Figure 4.

Figure 8 shows a modification of the main resilient unit comprising the inner and outer bands 48 and 49 and the rubber 50, as well as the auxiliary resilient unit, comprising the bands 45 and 46 and the rubber 47, in which the use of metal springs has been dispensed with entirely. It will be seen that the permanent stops 67 and 68 perform the function of the springs 65 in limiting the rotating movement of the driven and driving members 40 and 42 around each other in absorbing torque and brake shock. It will be understood that the number of these stops 67 and 68 used will depend on the character of the work imposed on the wheel structure. The dotted line 71 shows what occurs under normal road impact with the inner band 49 of the main resilient unit moving into the dotted position 71. As the movement is continued under heavy load conditions and terrific road impact the inner band 49 of the main resilient member moves with the shoulder 44 of the floating driven member 40 until contact is made with the outer band 45 of the auxiliary member, and the outer band 45 of the auxiliary member moves into the dotted position 70 or beyond that position depending on the severity of the shock imposed and the time required to dampen it out.

Figure 9 shows the general assembly of the driving member 66 which is of the same identical type described for Figure 1, and has a threaded stud 72 and a hardened bushing 73 that revolves around the outer wall of the stud 72.

An examination of Figures 6 and 7 will show that the main resilient unit, comprising the inner and outer bands 48 and 49 and the resilient material permanently attached thereto, when rigidly mounted on the driven and driving members 40 and 42 by means of the fastening devices 53 and 54, is capable of absorbing any anticipated torque or brake shock as the driven and driving members 40 and 42 move in opposite directions against the resistance of the resilient material which is used in the same identical manner as already described in Figure 1. It will also be observed that the driven member 40 is mounted in a floating position and is capable of eccentric displacement under load or road shock. It will therefore be clearly understood from Figures 6 and 7 that the floating driven member 40 is capable of a predetermined amount of movement under road and load shock before the shoulder 44 contacts with the outer band 45 of the auxiliary road impact shock absorbing unit, and it is, therefore, possible to have the main resilient unit, comprising the bands 48 and 49 and the resilient material 50, designed to absorb road shock with an empty vehicle or a partially loaded vehicle. As the shoulder 44 of the floating driven member 40 moves upward under increasing load or road impact, contact is made with the outer band 45 and the cushioning resistance to the blow is increased and predetermined by means of the auxiliary resilient material 47 so that the blow may be dampened out regardless of load and road conditions. Attention is directed to the flange on the inboard side of the outer band 45 and the flange on the outboard side of the inner band 46 which cooperate to limit eccentric movement of the outer band 45 in absorbing road and load shock transmitted through the floating driven member 40.

Heretofore in this art, it has been impossible to construct a cheap, durable, road impact shock absorbing axle suspension capable of functioning properly with both a loaded vehicle and an empty one. The reason for this will be understood from the fact that a much softer condition is required to be effective with an empty vehicle than with a fully loaded vehicle, and, if provision was made to cushion road impact shock when the vehicle was empty, the same means became practically useless when the vehicle was fully loaded, since the resilient material employed with usually fully compressed prior to shock. If, on the other hand, provision was made to take care of road impact shock when the vehicle was fully loaded the resilient means used was usually too stiff to be of any service when the vehicle was empty. With the construction disclosed in Figures 6 and 7, road and load shock with an empty or partially filled vehicle is absorbed through the main resilient unit and as the vehicle is loaded to capacity the stiffer auxiliary road impact shock absorbing unit is brought into action and a desirable cushioning condition is always possible regardless of load or road conditions.

It is to be understood however that under certain conditions, such as in railroad work where the empty vehicle is of tremendous weight and the passenger load has slight bearing on the total load condition, that the main resilient member of my construction would be mounted in direct constant contact with the outer band of the auxiliary resilient unit to obtain a maximum amount of cushioning for road and load shock, under all conditions of operation.

Heretofore torque and brake cushion drives have usually been an integral part of the road impact shock absorbing means, and the stiffening or softening of the resilient material used to properly handle one condition, has adversely affected the other condition under certain operating requirements. With my construction it will be seen that the amount of movement provided for cushioning road impact may be no more than ½" while the amount of movement to dampen out torque or brake shock may be as much as 1½" in the same wheel, because I am able to use an auxiliary road impact shock absorbing member which is separate and entirely distinct from my torque and brake cushion drive.

It will be understood from the foregoing description of the assembly and operation of the construction shown in Figures 6 and 7, that it is absolutely noiseless under those conditions wherein the main resilient unit is in constant contact with the auxiliary resilient unit. The possibility of noise in the construction wherein the main resilient unit moves independently under road impact shock before contacting with the auxiliary resilient unit, can only occur when these two units meet in absorbing severe road and load shock but the generous use of rubber in both units is bound to deaden any noise that may occur to such an extent, that it will not be noticed.

While I have shown a wheel in the present embodiments suitable for automotive transportation, it is to be understood that the general assembly and construction shown may be applied to all forms of transportation, particularly electric railway and steam railroad transportation, either in the form of a quick detachable wheel assembly as shown or as a pressed-on assembly, employing an integral hub member in place of the cylindrical support 12 of Figure 1, and 52 of Figure 6.

In accordance with my present invention I have devised a driving and a driven member, the members being connected by means of a novel flexible and resilient driving unit, preferably consisting of two annuli interconnected by the driving means such as for example, rubber under initial tension, mechanical resilient driving members, or a combination of both of such driving means, circumferentially spaced from each other.

Attention is also particularly directed to the novel auxiliary cushion employed, which is freely revoluble between the driving and driven members and will absorb and compensate for any shock or stresses under variable load or road conditions.

Attention is also directed to the fact that in accordance with this invention the flexible and resilient driving unit and the auxiliary cushioning unit may be removed and assembled as a unit of structure with the driving and driven wheel members without the use of any special tools and by unskilled labor.

Having thus described my invention what I claim as new and desire to secure by Letters Patent, is:—

1. In a shock absorbing wheel, an outer and an inner wheel member capable of relative circumferential movement and having cooperating parts contributing to form an annular chamber, and a driving unit insertable into and removable from said chamber as a unit of structure, and comprising an inner and an outer annulus, and rubber under initial tension interconnecting said annuli.

2. In a shock absorbing wheel, an outer and an inner wheel member capable of relative circumferential movement and having cooperating parts contributing to form an annular chamber, a driving unit insertable into and removable from said chamber as a unit of structure, and comprising an inner and an outer annulus, and rubber under initial tension interconnecting said annuli, and flexible mechanical driving means carried by one of said annuli and effective to drive the other annulus and circumferentially spaced from each other.

3. In a shock absorbing wheel, a hub, an inner member carried by said hub, an outer tread carrying member loosely mounted on said inner member, and a driving unit between said members and connected therewith, said driving unit comprising spaced annular members, having circumferentially spaced flexible and resilient driving means interconnecting them.

4. In a shock absorbing wheel, a hub, an inner wheel member carried thereby, an outer tread carrying wheel member cooperating with said first member to form an annular chamber, a driving unit removable from and insertable into said chamber as a unit of structure, and comprising an outer annulus secured to said inner wheel member and an inner annulus secured to said outer tread carrying member, and circumferentially spaced resilient driving means interconnecting said annuli to form a driving connection between said wheel member and said tread member.

5. The herein described driving unit having two relative revoluble bodies comprising an inner and an outer annulus, and rubber in initial tension bonded to said annuli and forming a driving cushion between them.

6. In a shock absorbing wheel, a driving and a driven member, and an annular driving unit comprising an outer annulus connected with said driving member, an inner annulus connected with said driven member and a flexible and resilient connection between said annuli.

7. In a shock absorbing wheel, a driving member, a driven member surrounding the driving member, an annular driving unit between said members and connected therewith and comprising an outer annulus, an inner annulus, spring devices effective to form a driving connection between said annuli, and circumferentially spaced rubber secured to said annuli under initial tension.

8. In a shock absorbing wheel, a driving member, a driven member surrounding the driving member, an annular detachable resilient driving unit interconnecting said members, and an annular cushioning member between said driving and driven members and brought into action under abnormal load or road conditions to which the wheel is subjected.

9. In a shock absorbing wheel, an outer and an inner wheel member capable of relative circumferential movement and having cooperating parts contributing to form an annular chamber, and a driving unit insertable into and removable from said chamber as a unit of structure, and comprising an inner and an outer annulus, and rubber under initial tension interconnecting said annuli, said outer and inner wheel members remaining concentric under all driving conditions.

10. In a shock absorbing wheel, an outer and an inner wheel member capable of relative circumferential movement and having cooperating parts contributing to form an annular chamber, a driving unit insertable into and removable from said chamber as a unit of structure, and comprising an inner and an outer annulus, and rubber under initial tension interconnecting said annuli, and flexible mechanical driving means carried by one of said annuli and effective to drive the other annulus and circumferentially spaced from each other, said outer and inner wheel members remaining concentric under all driving conditions.

11. In a shock absorbing wheel, an outer and an inner wheel member capable of relative circumferential movement, and a driving unit interconnecting said members and removable and assembled as a unit of structure, said driving unit comprising an inner and an outer annulus, and circumferentially spaced flexible driving members interconnecting said annuli, a separate annular cushioning member insertable and removable as a unit of structure between said outer and inner wheel members, the inner annulus of the driving unit being capable of eccentric displacement and cooperating with said cushioning member to absorb road and load shock.

12. In a shock absorbing wheel, an outer and an inner wheel member capable of relative circumferential movement and having cooperating parts contributing to form an annular chamber, and a driving unit insertable into and removable from said chamber as a unit of structure, and comprising an inner and an outer annulus, and rubber under initial tension interconnecting said annuli, a separate annular cushioning member insertable and removable as a unit of structure between said outer and inner wheel members, the inner annulus of the driving unit being capable of eccentric displacement and cooperating with said cushioning member to absorb road and load shock.

13. In a shock absorbing wheel, an outer and an inner wheel member capable of relative circumferential movement and having cooperating parts contributing to form an annular chamber, a driving unit insertable into and removable from said chamber as a unit of structure, and comprising an inner and outer annulus and rubber under initial tension interconnecting said annuli, and flexible mechanical driving means carried by one of said annuli and effective to drive the other annulus and circumferentially spaced from each other, a separate annular cushioning member insertable and removable as a unit of structure between said outer and inner wheel members, the inner annulus of the driving unit being capable of eccentric displacement and cooperating with said cushioning member to absorb road and load shock.

14. In a shock absorbing wheel, an outer and an inner wheel member capable of relative circumferential movement, means to limit the extent of such relative movement, and a driving unit interconnecting said members and removable and assembled as a unit of structure, said driving unit comprising an inner and an outer annulus, and circumferentially spaced flexible driving members interconnecting said annuli, a separate annular cushioning member insertable and removable as a unit of structure between said outer and inner wheel members, the inner annulus of the driving unit being capable of eccentric displacement and cooperating with said cushioning member to absorb road and load shock.

15. In a shock absorbing wheel, an outer and an inner wheel member capable of relative circumferential movement and having cooperating parts contributing to form an annular chamber, means to limit the extent of such relative movement, and a driving unit insertable into and removable from said chamber as a unit of structure, and comprising an inner and an outer annulus, and rubber under initial tension interconnecting said annuli, a separate annular cushioning member insertable and removable as a unit of structure between said outer and inner wheel members, the inner annulus of the driving unit being capable of eccentric displacement and cooperating with said cushioning member to absorb road and load shock.

16. In a shock absorbing wheel, an outer and an inner wheel member capable of relative circumferential movement and having cooperating parts contributing to form an annular chamber, means to limit the extent of such relative movement, a driving unit insertable into and removable from said chamber as a unit of structure, and comprising an inner and an outer annulus, and rubber under initial tension interconnecting said annuli, flexible mechanical driving means carried by one of said annuli and effective to drive the other annulus and circumferentially spaced from each other, a separate annular cushioning member insertable and removable as a unit of structure between said outer and inner wheel members, the inner annulus of the driving unit being capable of eccentric displacement and cooperating with said cushioning member to absorb road and load shock.

17. In a shock absorbing wheel, a driving and a driven member, and an annular driving unit comprising an outer annulus connected with said driving member, an inner annulus connected with said driven member and a flexible and resilient connection between said annuli, and means to limit relative movement between said driving and driven members.

18. In a shock absorbing wheel, a driving and a driven member, and an annular driving unit comprising an outer annulus connected with said driving member, an inner annulus connected with said driven member, and a flexible and resilient connection between said annuli, and means to limit relative movement between said driving and driven members, said driven member being capable of eccentric displacement and cooperating with an annular cushioning member to absorb road and load shock.

19. In a shock absorbing wheel, a driving and a driven member, and an annular driving unit comprising an outer annulus connected with said driving member, an inner annulus connected with said driven member and a flexible and resilient connection between said annuli, means to limit relative movement between said driving and driven members, said driven member being capable of eccentric displacement and cooperating with an annular cushioning member to absorb road and load shock, means to limit the eccentric displacement of said driven member.

20. In a shock absorbing wheel, a hub, a driving and a driven member, and an annular driving unit comprising an outer annulus connected with said driving member, an inner annulus connected with said driven member and a flexible and resilient connection between said annuli, means to limit relative movement between said driving and driven members, said driving member being capable of eccentric displacement and cooperating with an annular cushioning member to absorb road and load shock, and means to limit the eccentric displacement of said driven member.

WILLIAM A. BROWN.